(12) United States Patent
Ge et al.

(10) Patent No.: US 9,007,974 B2
(45) Date of Patent: Apr. 14, 2015

(54) METHOD AND APPARATUS FOR ALIGNING DOWNLINK DISCONTINUOUS RECEPTION PATTERNS IN MULTIFLOW HSDPA

(71) Applicant: QUALCOMM Incorporated, San Diego, CA (US)

(72) Inventors: Weiyan Ge, San Jose, CA (US); Arjun Bharadwaj, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 13/787,070

(22) Filed: Mar. 6, 2013

(65) Prior Publication Data

US 2013/0242829 A1    Sep. 19, 2013

Related U.S. Application Data

(60) Provisional application No. 61/612,814, filed on Mar. 19, 2012.

(51) Int. Cl.
| | |
|---|---|
| H04W 52/02 | (2009.01) |
| H04W 72/04 | (2009.01) |
| H04W 56/00 | (2009.01) |
| H04W 76/04 | (2009.01) |
| H04B 7/02 | (2006.01) |
| H04B 7/06 | (2006.01) |

(52) U.S. Cl.
CPC ...... *H04W 52/0212* (2013.01); *H04W 72/0446* (2013.01); *H04W 56/005* (2013.01); *H04W 76/048* (2013.01); *H04W 52/0216* (2013.01); *H04B 7/022* (2013.01); *H04B 7/024* (2013.01); *H04B 7/0619* (2013.01)

(58) Field of Classification Search
USPC .................................................. 370/336, 311
See application file for complete search history.

(56) References Cited

U.S. PATENT DOCUMENTS

| | | |
|---|---|---|
| 5,828,659 A | 10/1998 | Teder et al. |
| 6,625,467 B2 | 9/2003 | New et al. |
| 2003/0007470 A1 | 1/2003 | Grilli et al. |
| 2008/0192703 A1 | 8/2008 | Suzuki |
| 2012/0069798 A1* | 3/2012 | Vitthaladevuni et al. ..... 370/328 |

(Continued)

FOREIGN PATENT DOCUMENTS

| | | |
|---|---|---|
| WO | 2011025295 A2 | 3/2011 |
| WO | 2012038117 A1 | 3/2012 |

OTHER PUBLICATIONS

International Search Report and Written Opinion—PCT/US2013/031783—ISA/EPO—Jun. 28, 2013.

(Continued)

*Primary Examiner* — Albert T Chou
(74) *Attorney, Agent, or Firm* — Charles Chesney

(57) ABSTRACT

Aspects of this disclosure relate to methods and apparatuses for aligning downlink discontinuous reception patterns in multiflow High-Speed Downlink Packet Access (HSDPA). One aspect of the disclosure provides a method for wireless communications. The method includes: communicatively connecting with a user equipment (UE), a first cell, and a second cell; determining a sub-frame pairing between the first cell and the second cell; and selectively updating the sub-frame pairing based on a timing offset representative of a sub-frame delay between the first cell and the second cell.

50 Claims, 10 Drawing Sheets

(56) References Cited

U.S. PATENT DOCUMENTS

| | | | |
|---|---|---|---|
| 2012/0140689 A1 | 6/2012 | Pelletier et al. | |
| 2012/0176984 A1 | 7/2012 | Susitaival et al. | |
| 2012/0207040 A1 | 8/2012 | Comsa et al. | |
| 2012/0257519 A1* | 10/2012 | Frank et al. | 370/252 |
| 2013/0114577 A1* | 5/2013 | Cai et al. | 370/336 |

OTHER PUBLICATIONS

Nokia Siemens Networks, "HSDPA Multiflow interaction with DTX/DRX, eSCC, and HS-SCCH-less operation", 3GPP TSG-RAN WG2 Mtg #77, R2-120279, 2012, 4 pgs.

Qualcomm, et al., "HSDPA Multiflow Data Transmission", 3GPP TSG RAN Meeting #53, RP-111375, 2011, 16pgs.

Qualcomm, "HS-DPCCH Timing in Multiflow HSDPA", 3GPP TSG RAN WG1 Meeting #68, R1-120600, 2012, 6 pgs.

Qualcomm, "Physical Layer Design aspects of MP-HSPA", 3GPP TSG RAN WG1 Meeting #66bis, R1-113343, 2011, 4pgs.

Sayenko, "MF-HSDPA Status Report, Core Part: HSDPA Multiflow data transmission", TSG RAN #55, RP-120068, 2012, 4pgs.

* cited by examiner

METHOD AND APPARATUS FOR ALIGNING DOWNLINK DISCONTINUOUS RECEPTION PATTERNS IN MULTIFLOW HSDPA

CROSS-REFERENCE TO RELATED APPLICATIONS

This application claims priority to and the benefit of provisional patent application No. 61/612,814 filed in the United States Patent Office on Mar. 19, 2012, entitled METHOD AND APPARATUS FOR ALIGNING DOWNLINK DISCONTINUOUS RECEPTION PATTERNS IN MULTIFLOW HSDPA, the entire content of which is incorporated herein by reference.

BACKGROUND

1. Field

Aspects of the present disclosure relate generally to wireless communication systems, and more particularly, to method and apparatus for aligning downlink discontinuous reception patterns in multiflow High-Speed Downlink Packet Access (HSDPA).

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Mobile Telecommunications System (UMTS) Terrestrial Radio Access Network (UTRAN). UMTS is a third generation (3G) mobile phone technology supported by the 3rd Generation Partnership Project (3GPP). UTRAN is the radio access network (RAN) defined as a part of UMTS. UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSDPA), which provides higher data transfer speeds and capacity to associated UMTS networks.

As demand for mobile broadband access continues to increase, research and development continue to advance UMTS technologies—not only to meet the growing demand for mobile broadband access, but to advance and enhance user experience with mobile communications.

As an example, Multi-Point (MP) HSDPA has been recently introduced, in which plural cells can provide high-speed downlink communication to a mobile station, such that the mobile station is capable of aggregating the transmissions from those cells, within the same frequency carrier. In HSDPA MP transmission (TX), a data stream is split for two or more cells to transmit. In intra-NodeB MP TX, where the mobile station is served by two or more cells in the same NodeB, a single Medium Access Control (MAC) entity is shared by the two cells, and thus the split can occur at the MAC layer. However, in inter-NodeB MP TX, where the mobile station is served by two cells in different NodeBs, the MAC entity at each NodeB is separate.

As a relatively new system, various issues arise in this system that may not have been addressed in other downlink carrier aggregation systems such as DC-HSDPA. Thus, there is a need to identify and address issues relating to system-level architecture, packet flow control, mobility, and others.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of this disclosure relate to methods and apparatuses for aligning downlink discontinuous reception patterns in multiflow High-Speed Downlink Packet Access (HSDPA).

One aspect of the disclosure provides a method for wireless communications. The method includes: communicatively connecting with a user equipment, a first cell, and a second cell; determining a sub-frame pairing between the first cell and the second cell; selectively updating the sub-frame pairing based on a timing offset representative of a sub-frame delay between the first cell and the second cell.

Another aspect of the disclosure provides an apparatus for wireless communications. The apparatus includes: means for communicatively connecting with a user equipment, a first cell, and a second cell; means for determining a sub-frame pairing between the first cell and the second cell; and means for selectively updating the sub-frame pairing based on a timing offset representative of a sub-frame delay between the first cell and the second cell.

Another aspect of the disclosure provides a computer program product, including: a computer-readable medium including code for causing an RNC to: communicatively connect with a user equipment, a first cell, and a second cell; determine a sub-frame pairing between the first cell and the second cell; and selectively update the sub-frame pairing based on a timing offset representative of a sub-frame delay between the first cell and the second cell.

Another aspect of the disclosure provides an apparatus for wireless communications. The apparatus includes at least one processor, a memory coupled to the at least one processor, and a communication interface coupled to the at least one processor. The at least one processor is configured to: communicatively connect with a user equipment, a first cell, and a second cell; determine a sub-frame pairing between the first cell and the second cell; and selectively update the sub-frame pairing based on a timing offset representative of a sub-frame delay between the first cell and the second cell.

Another aspect of the disclosure provides a method for wireless communications. The method includes: transmitting a current sub-frame pairing between a first cell and a second cell to a radio network controller (RNC), the current sub-frame pairing having a timing offset representative of a sub-frame delay between the first cell and the second cell; and receiving a confirmation regarding the sub-frame pairing, or an updated sub-frame pairing between the first and second cells and corresponding timing, from the RNC.

Another aspect of the disclosure provides an apparatus for wireless communications. The apparatus includes: means for transmitting a current sub-frame pairing between a first cell and a second cell to an RNC, the current sub-frame pairing having a timing offset representative of a sub-frame delay between the first cell and the second cell; and means for receiving a confirmation regarding the sub-frame pairing, or an updated sub-frame pairing between the first and second cells and corresponding timing, from the RNC.

Another aspect of the disclosure provides an apparatus for wireless communications. The apparatus includes: means for transmitting a current sub-frame pairing between a first cell and a second cell to an RNC, the current sub-frame pairing having a timing offset representative of a sub-frame delay between the first cell and the second cell; and means for receiving a confirmation regarding the sub-frame pairing, or an updated sub-frame pairing between the first and second cells and corresponding timing, from the RNC.

Another aspect of the disclosure provides a computer program product, including: a computer-readable medium including code for causing a user equipment (UE) to: transmit a current sub-frame pairing between a first cell and a second cell to an RNC, the current sub-frame pairing having a timing offset representative of a sub-frame delay between the first cell and the second cell; and receive a confirmation regarding the sub-frame pairing, or an updated sub-frame pairing between the first and second cells and corresponding timing, from the RNC.

Another aspect of the disclosure provides an apparatus for wireless communication. The apparatus includes at least one processor, a communication interface coupled to the at least one processor, and a memory coupled to the at least one processor. The at least one processor is configured to: transmit a current sub-frame pairing between a first cell and a second cell to an RNC, the current sub-frame pairing having a timing offset representative of a sub-frame delay between the first cell and the second cell; and receive a confirmation regarding the sub-frame pairing, or an updated sub-frame pairing between the first and second cells and corresponding timing, from the RNC.

These and other aspects of the invention will become more fully understood upon a review of the detailed description, which follows.

BRIEF DESCRIPTION OF THE DRAWINGS

The features, nature, and aspects of the present disclosure will become more apparent from the detailed description set forth below when taken in conjunction with the drawings in which like reference characters identify correspondingly throughout and wherein.

DETAILED DESCRIPTION

Figure 1:
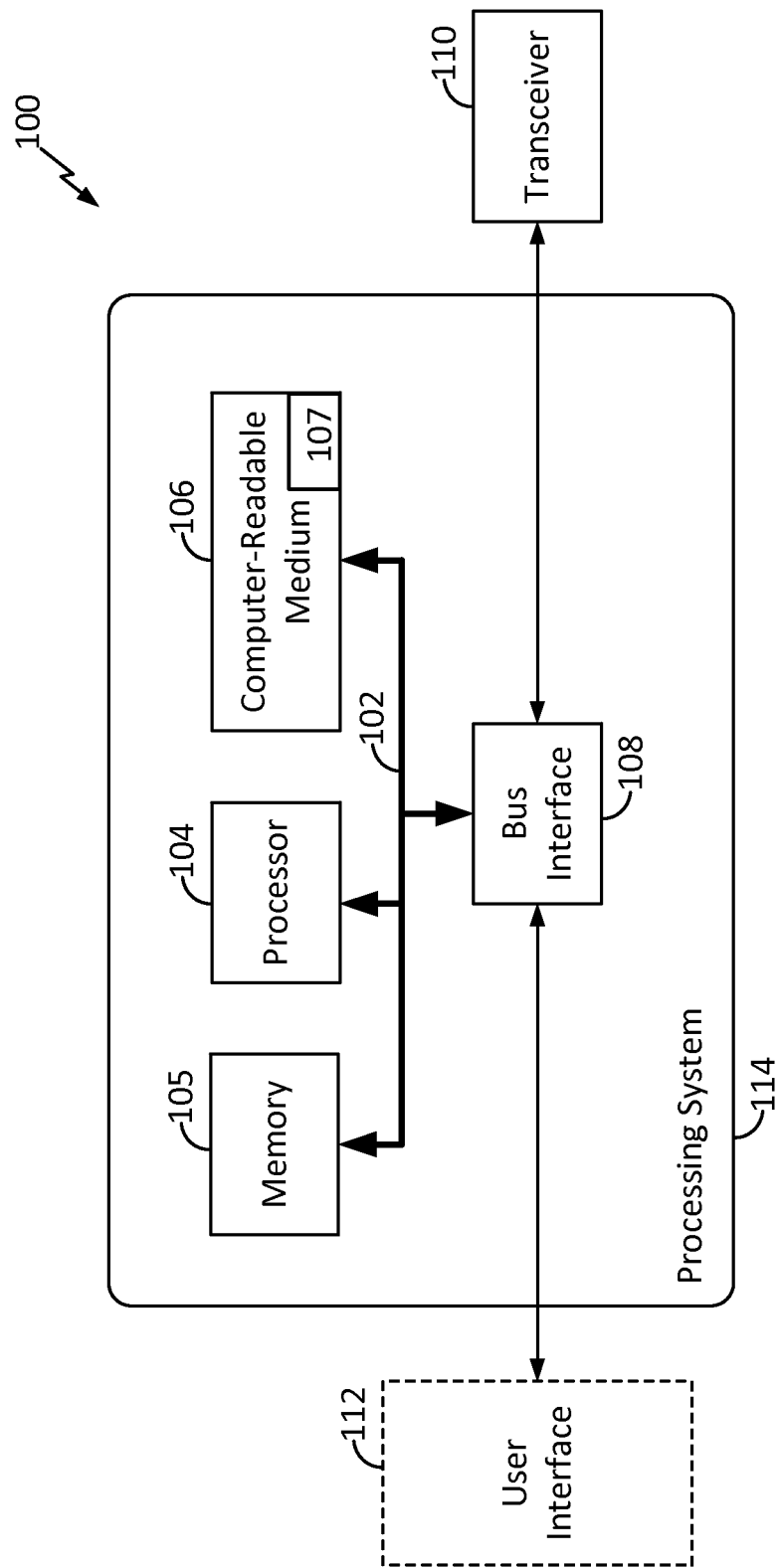
FIG. 1 is a block diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Here, "medium" may include any media that facilitates transfer of a computer program from one place to another. As an example, the software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, a memory 105, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. In some aspects, the apparatus 100 may include a communication interface including the transceiver 110. Depending upon the nature of the apparatus, a user interface 112 (e.g., keypad, display, speaker, microphone, joystick) may also be provided.

The processor 104 is responsible for managing the bus 102 and general processing, including the execution of software 107 stored in the memory 105 and or the computer-readable medium 106. The software 107, when executed by the processor 104, causes the processing system 114 to perform the various functions described infra for any particular apparatus. The computer-readable medium 106 may also be used for storing data that is manipulated by the processor 104 when executing software.

Figure 2:
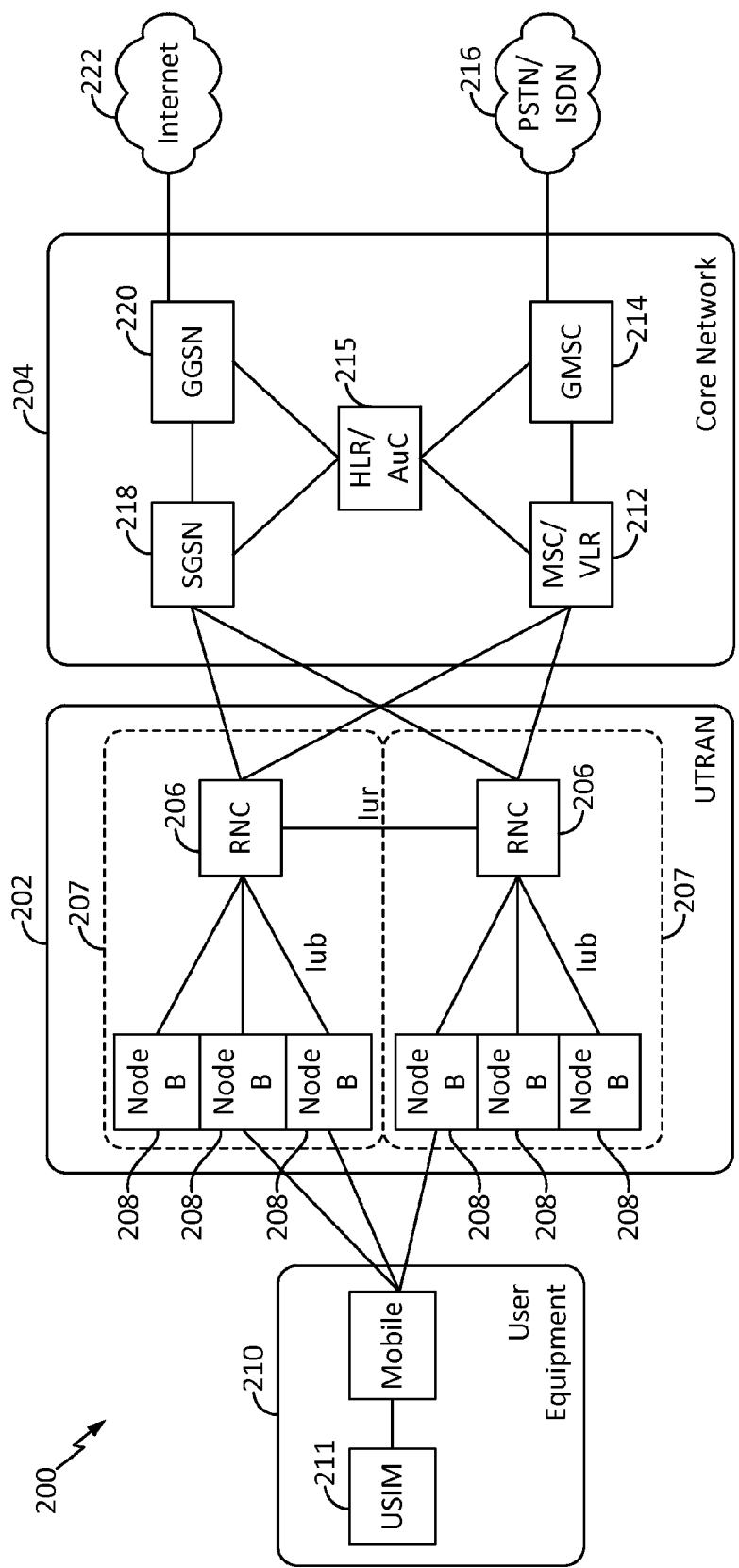
FIG. 2 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 2 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 may provide various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

The geographic region covered by the RNS 207 may be divided into a number of cells, with a radio transceiver apparatus serving each cell. One or more cells may be grouped into an entity commonly referred to as a NodeB in UMTS applications, but which may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three NodeBs 208 are shown in each RNS 207; however, the RNSs 207 may include any number of wireless NodeBs. The NodeBs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device.

The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the NodeBs 208. The downlink (DL), also called the forward link, refers to the communication link from a NodeB 208 to a UE 210, and the uplink (UL), also called the reverse link, refers to the communication link from a UE 210 to a NodeB 208.

The core network 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface may be a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such DS-CDMA technology and additionally calls for a frequency division duplexing (FDD). FDD uses a different carrier frequency for the uplink (UL) and downlink (DL) between a NodeB 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface.

Communication between the UE 210 and the NodeB 208 may be considered as including a physical (PHY) layer and a medium access control (MAC) layer. Further, communication between a UE 210 and an RNC 206 by way of a respective NodeB 208 may be considered as including a radio resource control (RRC) layer.

A high speed packet access (HSPA) air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

It should be appreciated that each of the entities described in FIG. 2, as well as other hardware mentioned herein, may be implemented using one or more components of the apparatus 100 as described. Thus, for example, the apparatus 100 may be representative of a UE, such as the UE 210, or an RNC, such as the RNC 206.

Figure 3:
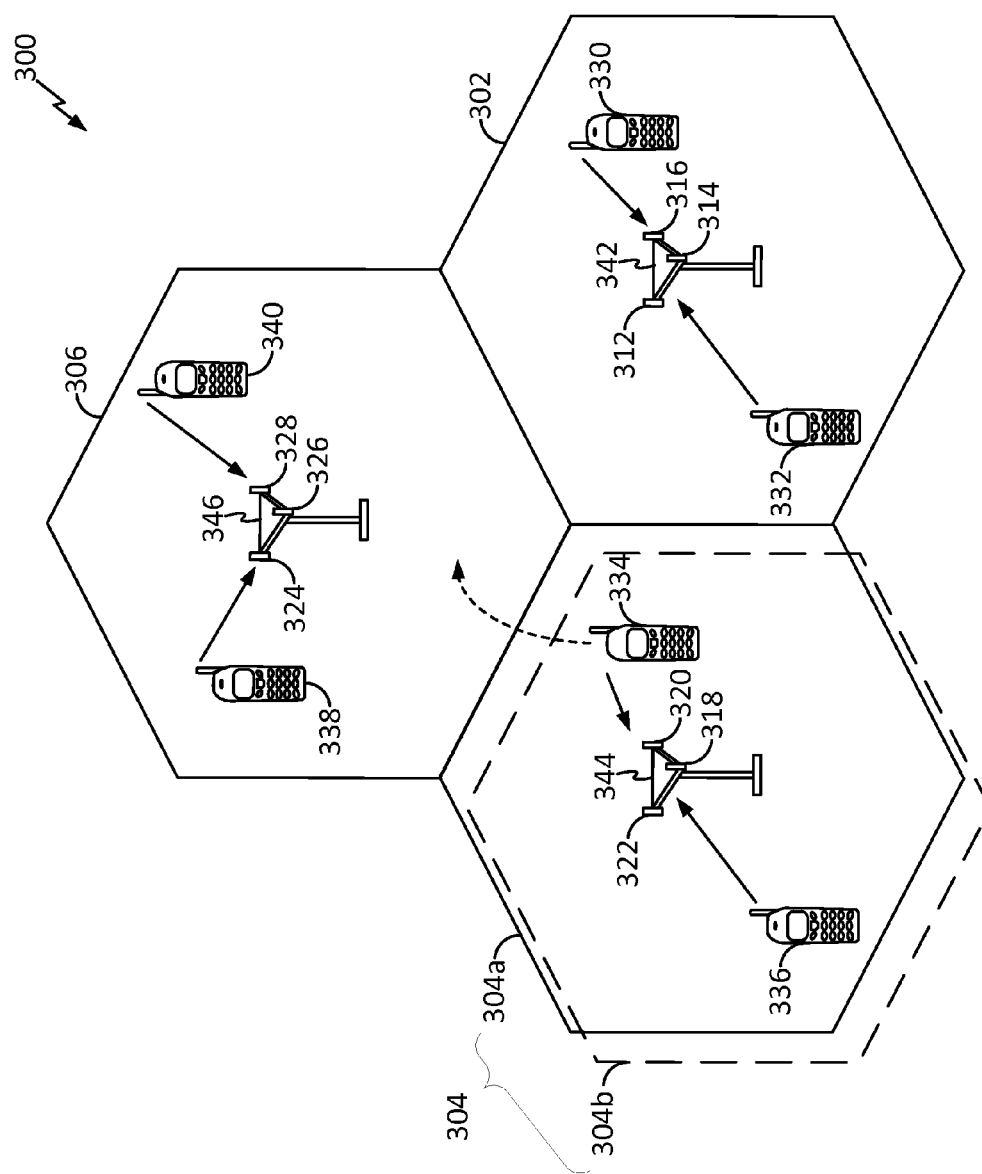
FIG. 3 is a conceptual diagram illustrating an example of an access network.

FIG. 3 illustrates, by way of example and without limitation, a simplified access network 300 in a UTRAN architecture, which may utilize HSPA. The system includes multiple cellular regions (cells), including cells 302, 304, and 306, each of which may include one or more sectors. Cells may be defined geographically, e.g., by coverage area, and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same NodeB 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector.

The cells 302, 304 and 306 may include several UEs that may be in communication with one or more sectors of each cell 302, 304 or 306. For example, UEs 330 and 332 may be in communication with NodeB 342, UEs 334 and 336 may be in communication with NodeB 344, and UEs 338 and 340 may be in communication with NodeB 346. Here, each NodeB 342, 344, 346 is configured to provide an access point to a core network 204 (see FIG. 2) for all the UEs 330, 332, 334, 336, 338, 340 in the respective cells 302, 304, and 306.

HSDPA was introduced in Release 5 of the 3GPP family of standard. One difference on the downlink between HSDPA and the previously standardized circuit-switched air-interface is the absence of soft-handover in HSDPA. This means that data is transmitted to the UE from a single cell called the HSDPA serving cell. As the user moves, or as one cell becomes preferable to another, the HSDPA serving cell may change.

To support HSDPA, a new transport layer channel, High-Speed Downlink Shared Channel (HS-DSCH) has been added. The HS-DSCH is implemented by defining three new physical layer channels, including a High Speed Physical Downlink Shared Channel (HS-PDSCH), which is a downlink channel for carrying user data that is both time and code multiplexed. Multi-code transmissions are allowed that translates to UE being assigned multiple channelization codes in the same transmission time interval (TTI), depending on the UE capability. The HS-DSCH also includes a High Speed Dedicated Physical Control Channel (HS-DPCCH), which is an uplink physical channel that carries acknowledgements of packets received on HS-PDSCH and also a Channel Quality Indication (CQI) transmitted from UEs, as further described herein. Thirdly, the HS-DSCH includes a High Speed Shared Control Channel (HS-SCCH), which is a fixed rate downlink physical channel used to carry downlink signaling related to HS-DSCH transmission. A UE monitors this channel continuously to determine when to read its data from the HS-DSCH, and the modulation scheme used on the assigned physical channel. Specifically, the downlink signaling provides timing and coding information for upcoming transmissions, thus allowing UEs to listen to the HS-DSCH at the correct time to use the correct codes for successful decoding of UE data.

In Rel. 5 HSDPA, a UE has one serving cell at any instance. Here, a serving cell is the cell on which the UE is camped. According to mobility procedures defined in Rel. 5 of 3GPP TS 25.331, the Radio Resource Control (RRC) signaling messages for changing the HSPDA serving cell are transmitted from the current HSDPA serving cell (i.e., the source cell), and not the cell that the UE reports as being the stronger cell (i.e., the target cell).

Further, with HSDPA the UE generally monitors and performs measurements of certain parameters of the downlink channel to determine the quality of that channel. Based on these measurements the UE can provide feedback to the NodeB on an uplink transmission, such as a channel quality indicator (CQI). Thus, the NodeB may provide subsequent packets to the UE on downlink transmissions having a size, coding format, etc., based on the reported CQI from the UE.

During a call with the source cell 304a, or at any other time, the UE 336 may monitor various parameters of the source cell 304a as well as various parameters of neighboring cells such as cells 304b, 306, and 302. Further, depending on the quality of these parameters, the UE 336 may maintain some level of communication with one or more of the neighboring cells. During this time, the UE 336 may maintain an Active Set, that is, a list of cells that the UE 336 is simultaneously connected to (i.e., the UTRAN cells that are currently assigning a downlink dedicated physical channel DPCH or fractional downlink dedicated physical channel F-DPCH to the UE 336 may constitute the Active Set).

Release 8 of the 3GPP standards brought dual cell HSDPA (DC-HSDPA), which enables a UE to aggregate dual adjacent 5-MHz downlink carriers. The dual carrier approach provides higher downlink data rates and better efficiency at multicarrier sites. Generally, DC-HSDPA utilizes a primary carrier and a secondary carrier, where the primary carrier provides the channels for downlink and uplink data transmissions, and the secondary carrier adds a second set of HS-PDSCHs and HS-SCCHs for downlink communication.

Figure 4:
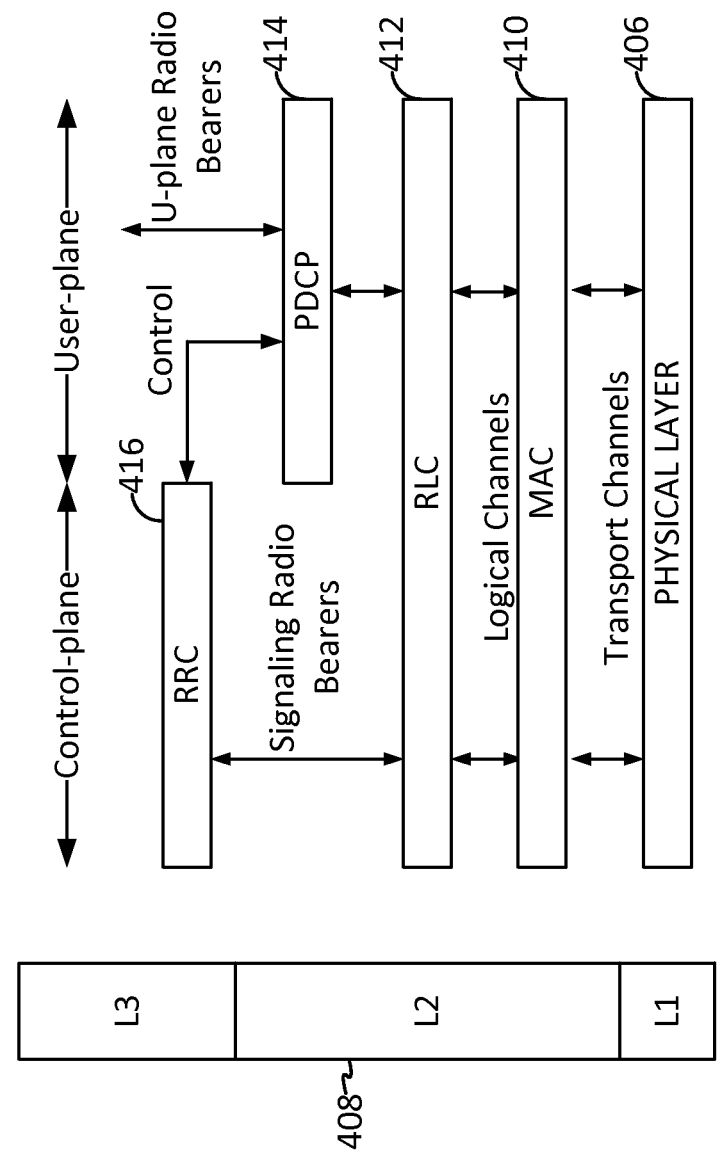
FIG. 4 is a conceptual diagram illustrating an example of a radio protocol architecture for the user plane and control plane.

The radio protocol architecture between the UE and the UTRAN may take on various forms depending on the particular application. An example for an HSPA system will now be presented with reference to FIG. 4, illustrating an example of the radio protocol architecture for the user and control planes between a UE and a NodeB. Here, the user plane or data plane carries user traffic, while the control plane carries control information, i.e., signaling.

Turning to FIG. 4, the radio protocol architecture for the UE and NodeB is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 (L2 layer) 408 is above the physical layer 406 and is responsible for the link between the UE and NodeB over the physical layer 406.

At Layer 3, a Radio Resource Control (RRC) layer 416 handles the control plane signaling between the UE and the NodeB. RRC layer 416 includes a number of functional entities for routing higher layer messages, handling broadcast and paging functions, establishing and configuring radio bearers, etc.

In the UTRAN air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between NodeBs.

The RLC sublayer 412 generally supports acknowledged, unacknowledged, and transparent mode data transfers, and provides segmentation and reassembly of upper layer data packets, retransmission of lost data packets, and reordering of data packets to compensate for out-of-order reception due to a hybrid automatic repeat request (HARQ). That is, the RLC sublayer 412 includes a retransmission mechanism that may request retransmissions of failed packets.

To provide the RLC retransmission mechanism, RLC protocol data units (PDUs) generally include a parameter called a sequence number. The sequence number may take different formats in accordance with whether the UE is in unacknowledged mode or acknowledged mode, but in general, the acknowledged mode PDU is used to coordinate RLC retransmissions. At certain intervals a UE may send an RLC-sublayer PDU called a Status PDU, which may include a field for one or more sequence numbers that were not correctly received, as well as a length indicator indicating the length of a gap where RLC PDUs were not correctly received. Of course, the format of the Status PDU may take other forms, such as including an explicit acknowledgment or negative acknowledgment (ACK/NACK) for each PDU, or any other suitable format. Additional information relating to RLC gaps and retransmissions is provided below.

Here, if the RLC sublayer 412 is unable to deliver the data correctly after a certain maximum number of retransmissions or an expiration of a transmission time, upper layers are notified of this condition and the RLC SDU may be discarded.

The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations. The MAC sublayer 410 includes various MAC entities, including but not limited to a MAC-d entity and MAC-hs/ehs entity.

As discussed above, DC-HSDPA provides for downlink carrier aggregation. The carrier aggregation achieved in 3GPP Release 8 DC-HSDPA and its subsequent enhancements provides benefits in terms of user experience, including latency reduction for bursty traffic.

According to aspects of the present disclosure, another form of aggregation, which may be referred to as soft aggregation, provides for downlink aggregation wherein the respective downlink cells utilize the same frequency carrier. Soft aggregation strives to realize similar gains to DC-HSDPA in a single-carrier network.

Figure 5:
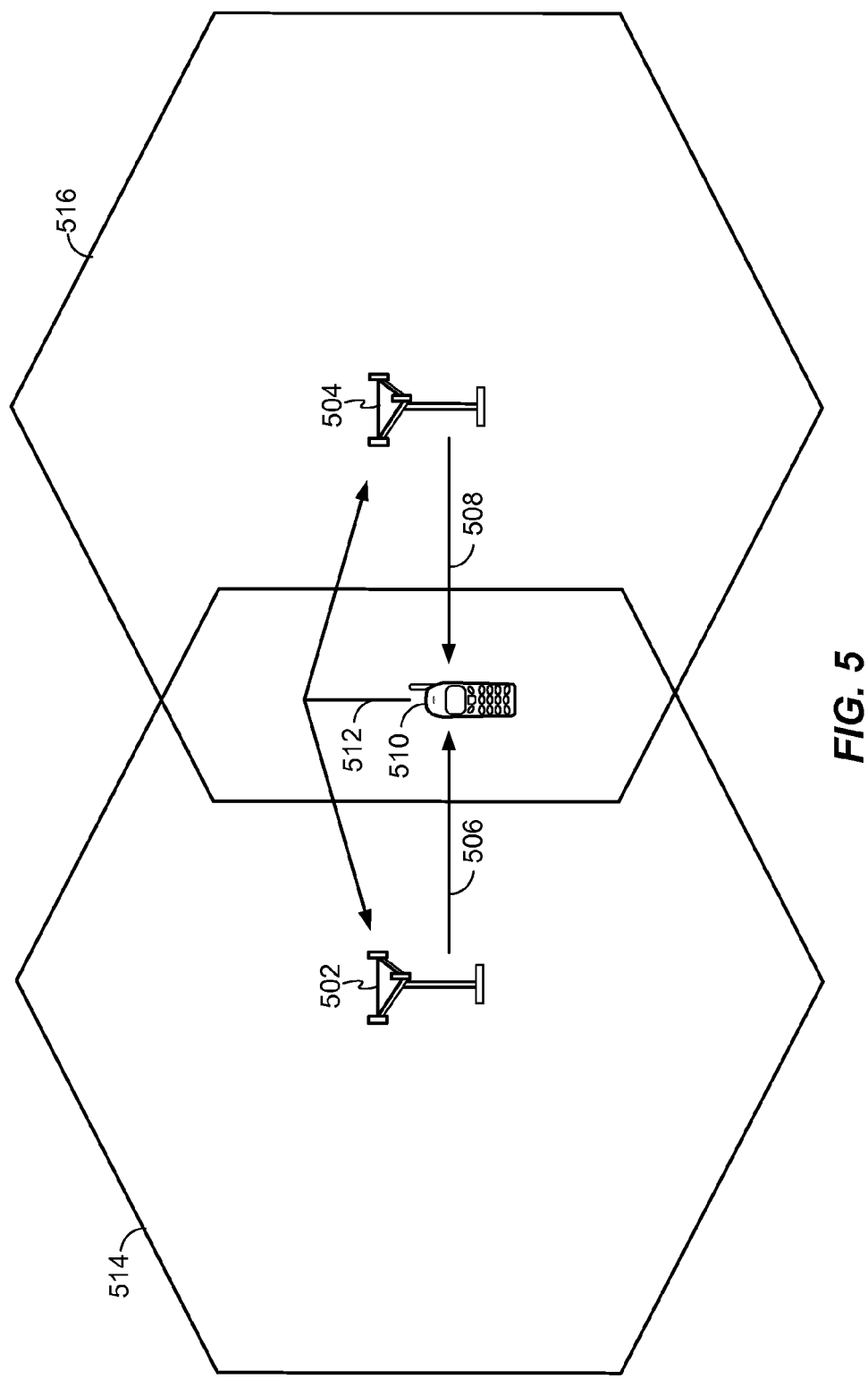
FIG. 5 is a schematic diagram illustrating a portion of a multi-point HSDPA network.

FIG. 5 illustrates an exemplary system for soft aggregation in accordance with some aspects of the present disclosure. In FIG. 5, there may be a geographic overlap between two or more cells 514 and 516, such that a UE 510 may be served, at least for a certain period of time, by the multiple cells. Thus, a wireless telecommunication system in accordance with the present disclosure may provide HSDPA service from a plurality of cells on a single frequency channel, such that a UE may perform aggregation. For example, a setup utilizing two or more cells may be referred to as Single Frequency Dual Cell HSDPA (SFDC-HSDPA), Coordinated Multi-Point HSDPA (CoMP HSDPA), or simply Multi-Point HSDPA. However, other terminology may freely be utilized. In this way, users at cell boundaries, as well as the overall system, may benefit from a high throughput. Here, the different cells may be provided by the same NodeB, or the different cells may be provided by disparate NodeBs.

In the scheme illustrated in FIG. 5, two NodeBs 502 and 504 each provide a downlink cell 506 and 508, respectively, wherein the downlink cells are in substantially the same carrier frequency. Of course, as already described, in another aspect, both downlink cells 506 and 508 may be provided from different sectors of the same NodeB. Here, the UE 510 receives and aggregates the downlink cells and provides an uplink channel 512, which is received by both NodeBs 502 and 504. The uplink channel 512 from the UE 510 may provide feedback information, e.g., corresponding to the downlink channel state for the corresponding downlink cells 506 and 508.

Figure 6:
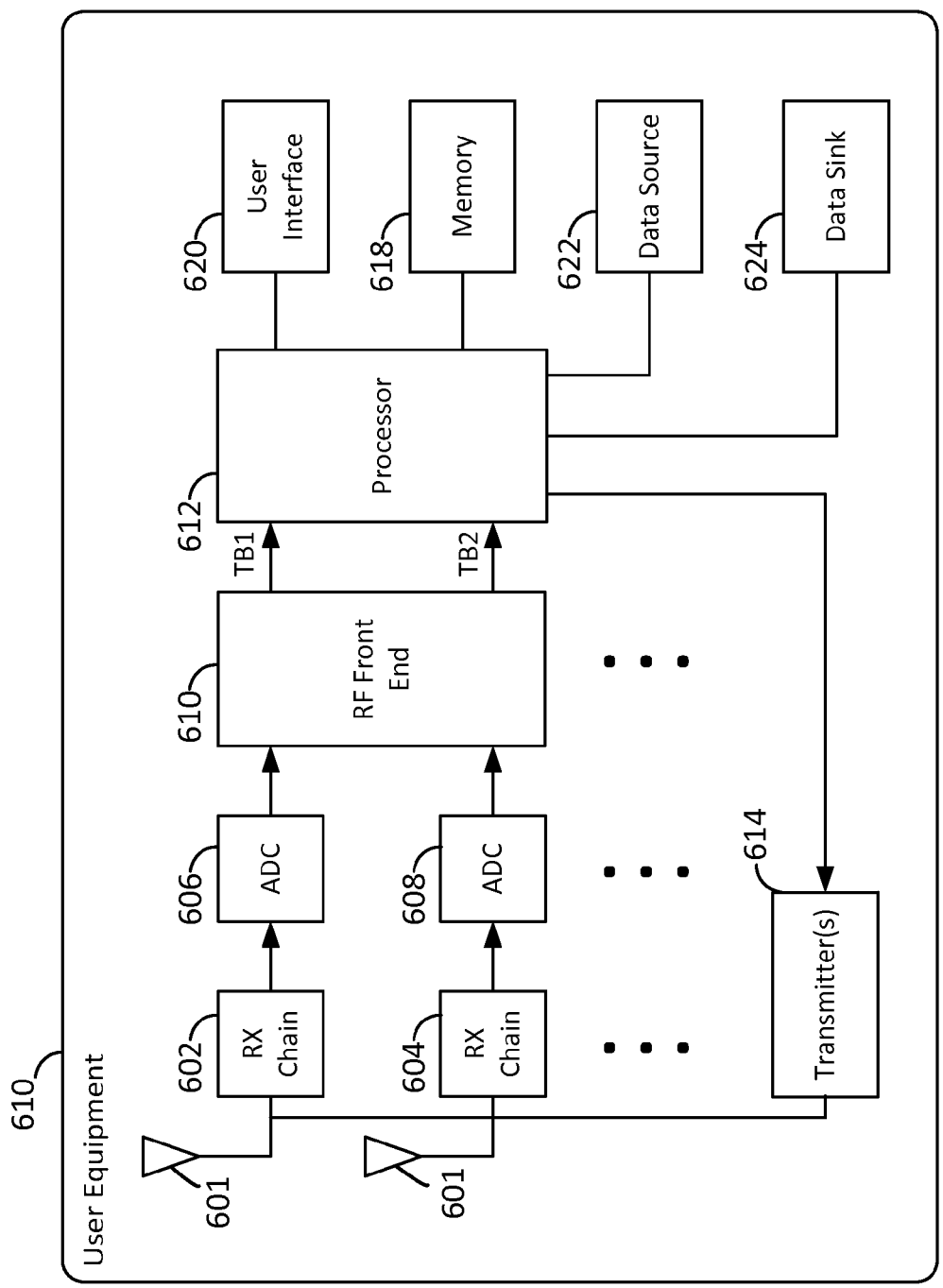
FIG. 6 is a block diagram illustrating a portion of a user equipment for use in a multiflow HSDPA network.

A DC-HSDPA-capable UE has two receive chains, each of which may be used to receive HS data from a different carrier. In a Multi-Point HSDPA-capable UE, if the plural receive chains are made to receive HS data from different cells, at least some of the benefits from aggregation can be realized in a single-carrier network. FIG. 6 is a simplified block diagram illustrating some of the components of an exemplary UE 610 for use in a multiflow HSDPA network in accordance with some aspects of the present disclosure. In the illustration, the UE 610 includes two receive antennas 601 for receiving respective downlink signals, as in a Single-Frequency Duel-Cell (SF-DC) or Dual-Frequency Duel-Cell (DF-DC) HSDPA network. However, within the scope of the present disclosure, a UE 610 may include any number of antennas for receiving downlink signals in the same carrier frequency or in any suitable number of different carrier frequencies. Further, the illustrated UE 610 shows an example for a single-band network. In a multi-carrier network where the UE 610 is configured to receive at least one carrier in each of two or more bands, the UE 610 may further include other components such as a diplexer, as is known to those of ordinary skill in the art.

Coupled to each of the antennas 601 may be a respective RF front end 602, 604. The RF front end may include such functional blocks as RF down-conversion, low-pass filtering, etc. The RF front ends 602 and 604 then feed into analog-to-digital converters (ADC) 606 and 608, respectively, which transform the received downlink channels to the digital domain to be further processed by a base-band unit (BBU) 610. The BBU 610 may include such functional blocks as carrier/antenna separation, a base-band detector, and a base-band decoder, configured to provide the received transport blocks to a processor 612 to be further processed in accordance with the received information. In some examples, the processor 612 may be the same as the processing system 134 illustrated in FIG. 1. The processor 612 may additionally be coupled to one or more transmitters 614, which may utilize one or more of the UE's antennas as managed by a suitable duplexer. The processor 612 may additionally utilize a memory 618 for storing code and information useful for the processing of the information. The UE 610 may further include a user interface 620, a data source 622, and data sink 624. The data source 622 and data sink 624 may provide and store suitable data during the operation of the UE 610. In some aspects of the disclosure, the UE 610 may be utilized to implement the processes and procedures described in FIGS. 1-10.

In order to save power during the operation of a UE, the UE (e.g., UE 610) is allowed to operate in DL discontinuous reception (DRX) mode. The DRX mode allows the turning off of a radio receiver for a UE when it does not expect to receive incoming messages. This is sometimes called sleep mode. For DRX to operate, the system must coordinate with the UE for the grouping of messages. The UE may then "wake up" (i.e., turn on its receive circuitry) only during scheduled periods to look for its messages. This reduces the power consumption, which extends battery life.

The DL DRX reception patterns and channel timings are carefully designed to minimize the receiver "on" time and thus maximize the energy saving. In legacy systems, the start of the HS-SCCH DRX radio frame, referred to as the CFN_DRX (n), is shifted by $\tau_{DRX}$ chips from the start $T_0$ of the associated downlink F-DPCH of CFN n, where $-3840$ chips$\leq\tau_{DRX}-T_0<3840$ chips. Specifically, the start of CFN_DRX (n) on the HS-SCCH is within a window of 2 ms (e.g., 1 ms ahead, 1 ms after) of the start of Connection Frame Name (CFN) (n) on UL DPCCH. The CFN provides a common frame reference to be used for ciphering and synchronized transport channel reconfiguration.

Figure 7:
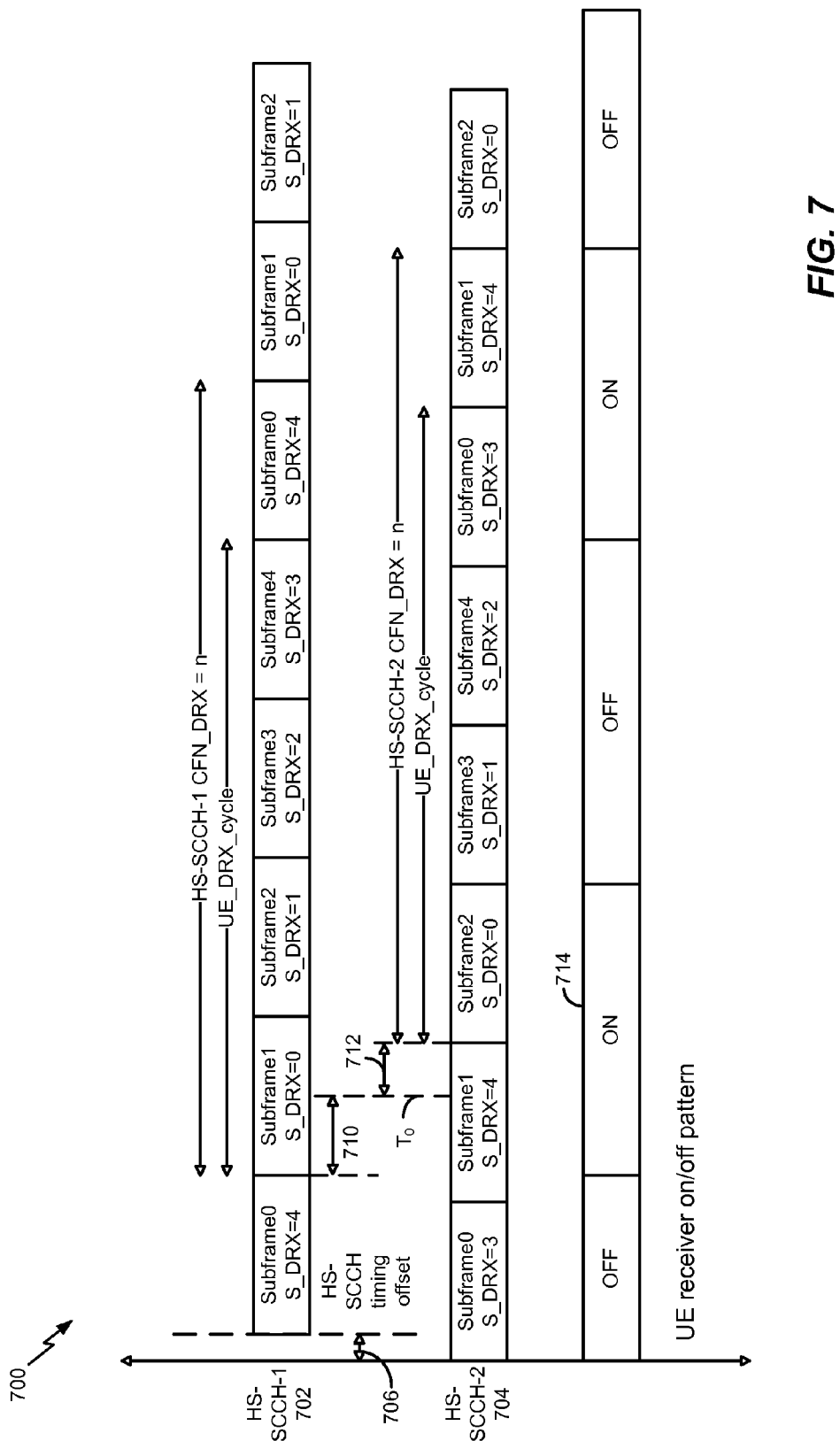
FIG. 7 is a timing diagram illustrating an example High Speed Shared Control Channel (HS-SCCH) reception pattern for multiflow that has not been aligned in accordance with the various aspects of the disclosed approach.

FIG. 7 is a timing diagram illustrating an example HS-SCCH reception pattern 700 for multiflow that has not been aligned in accordance with the various aspects of the disclosed approach. An HS-SCCH includes a number of subframes (e.g., subframe 0 to subframe 4). Each of the subframes includes three time slots that together constitute a transmit time interval (TTI). As illustrated with reference to FIG. 7, which illustrates a HS-SCCH reception pattern 700 with a 2 ms Enhanced Dedicated Channel (E-DCH) TTI, certain issues may arise with multi-link/multiflow application, particularly relating to where the UE is monitoring multiple HS-SCCHs 702 and 704 that are usually not aligned with each other in their sub-frame timing. For example, a multi-flow UE operating in DRX mode may be assigned a set of sub-frames on HS-SCCH-1 and a set of sub-frames on HS-SCCH-2. In FIG. 7, the HS-SCCH reception pattern may be defined as the set of sub-frames by HS-SCCH discontinuous reception radio frame number CFN_DRX and sub-frame number S_DRX (e.g., 0-4). The UE is turned on to receive the sub-frames beginning with S_DRX=0.

The offset (e.g., >0) on HS-SCCH timing may lead to an offset 706 on the start of HS-SCCH CFN_DRX than if the offset 706 was zero and the HS-SCCHs were aligned. As a consequence, the UE receiver (e.g., UE 210) needs to be on for a longer duration. This may significantly reduce the energy consumption gain from DL DRX. Specifically, in multiflow operations, the UE is monitoring multiple HS-SCCHs that are usually not aligned with each other. In Intra-NodeB multiflow, the timing of the HS-SCCH can be offset 706 by a time period of $\tau_{DIFF}$ at the transmitter in the range of 0.1 to 0.9 slots. The time offset $\tau_{DIFF}$ is the time difference between the HS-SCCH of the earlier cell and the HS-SCCH of the later cell. In the case of Inter-NodeB multiflow, the sub-frame offset 706 can be up to 1.5 slots due to a combination of drifts and propagation delays encountered. The offset on HS-SCCH timing may lead to an offset 706 on the start of HS-SCCH CFN_DRX, as shown in FIG. 7. In the figure, CFN_DRX n on HS-SCCH-1 702 starts at subframe 1 with a negative $\tau_{DRX}$ 710 in reference to $T_0$, while CFN_DRX n on HS-SCCH-2 704 starts at subframe 2 with a positive $\tau_{DRX}$ 712 in reference to $T_0$. The offset of the start of CFN_DRX between the two HS-SCCHs 702 and 704 (i.e., $\tau_{DRX}$ 710+ $\tau_{DRX}$ 712) in one example is close to one subframe.

As a consequence, the UE receiver needs to be awake for almost two subframes 714, as shown in the bottom of FIG. 7. Generally speaking, in legacy system, the UE receiver needs to be awake for one subframe in a DRX cycle (ignoring the ramp-up and ramp-down time). In multiflow operation (both intra-node and inter-node), with the offset 706 on the start of CFN_DRX, the UE receiver may be on for up to two subframes. This may significantly reduce the energy consumption gain from DL DRX.

In order to address misaligned HS-SCCHs, the disclosed approach redefines the HS-SCCH reception pattern to minimize or reduce the time the UE receiver is on. In one aspect of the disclosed approach, the start of CFN_DRX on one of the cells for the two cells in multiflow HSDPA is redefined based on the other cell. The new timing on CFN_DRX may ensure that an overlapping between the two HS-SCCH reception patterns is maximized or increased. According to aspects of the disclosure, the CFN_DRX of a later cell may be changed based on an earlier cell.

Figure 8:
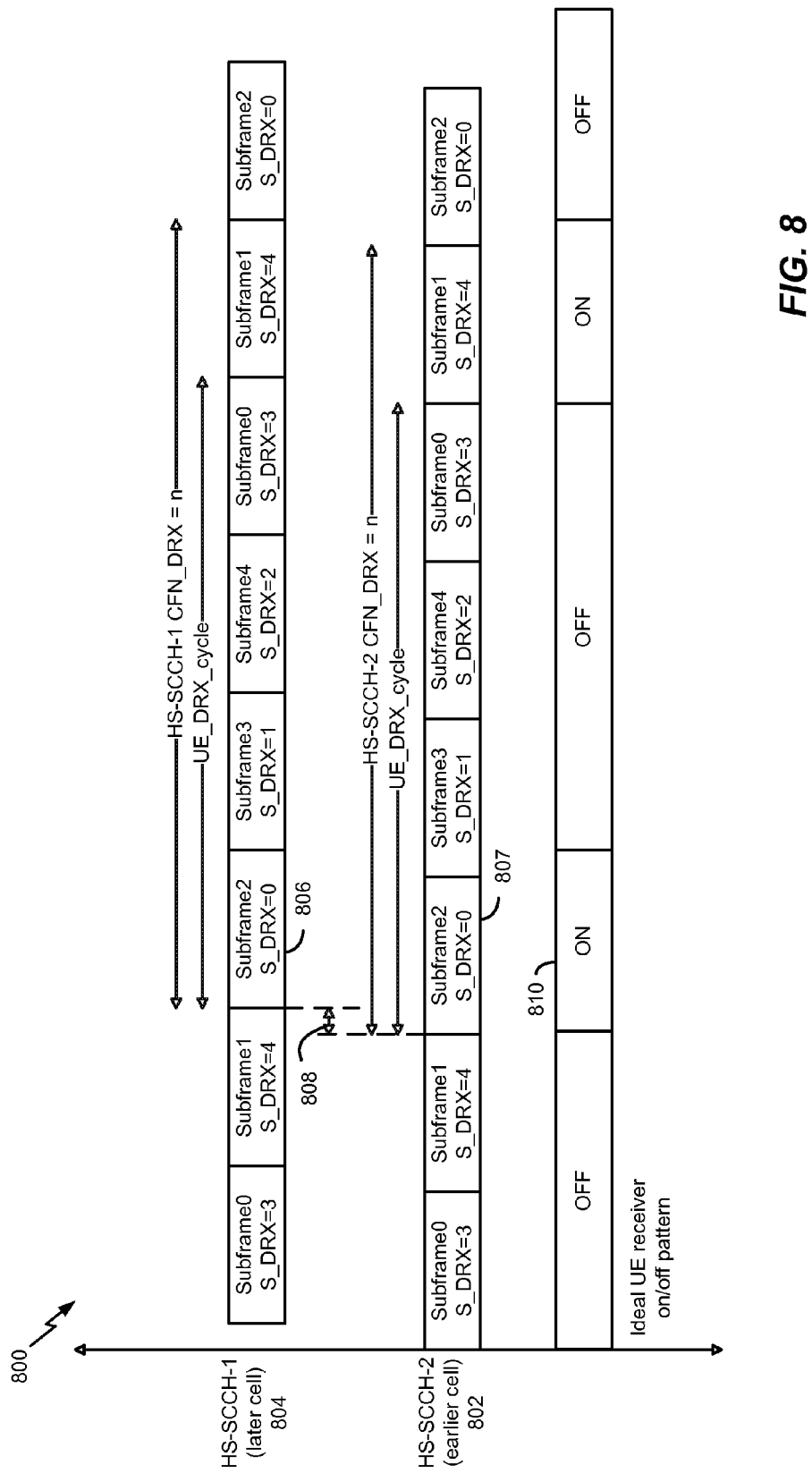
FIG. 8 is a timing diagram illustrating an example HS-SCCH reception pattern for multiflow that has been aligned in accordance with the various aspects of the disclosed approach.

FIG. 8 is a timing diagram illustrating an example HS-SCCH reception pattern 800 for multiflow that has been aligned in accordance with the various aspects of the disclosed approach. In FIG. 8 the HS-DSCH serving cells (e.g., cells 514 and 516) are assigned as either an earlier cell 802 or a later cell 804 for the purpose of increasing or maximizing HS-SCCH subframe overlapping. The cell for which the corresponding HS-SCCH and HS-PDSCH start and end earlier, is the earlier cell. The other cell is the later cell. The earlier and later cells selection is dependent on the cell timing and is not dependent on the DRX patterns. For the earlier cell (e.g., HS-SCCH-2 802), the timing and the start of HS-SCCH CFN_DRX remains the same. For the later cell (e.g., HS-SCCH-1 804), the HS-SCCH CFN_DRX (n) is now defined to start at the first HS-SCCH subframe 806 after the start of the CFN_DRX (n) (subframe 807) on the earlier cell, where n is the frame number. The new timing on CFN_DRX for the later cell 804 guarantees that an overlapping between the two HS-SCCH reception patterns is maximized or increased. As a result, the receiver may only need to be on for 3-3.9 slots (e.g., interval 810) in Intra-NodeB multiflow operation, depending on the timing offset $T_{cell}$ 808 between the two cells. For Inter-NodeB multiflow, the receiver may only need to be on for 3-4.5 slots.

Figure 9:
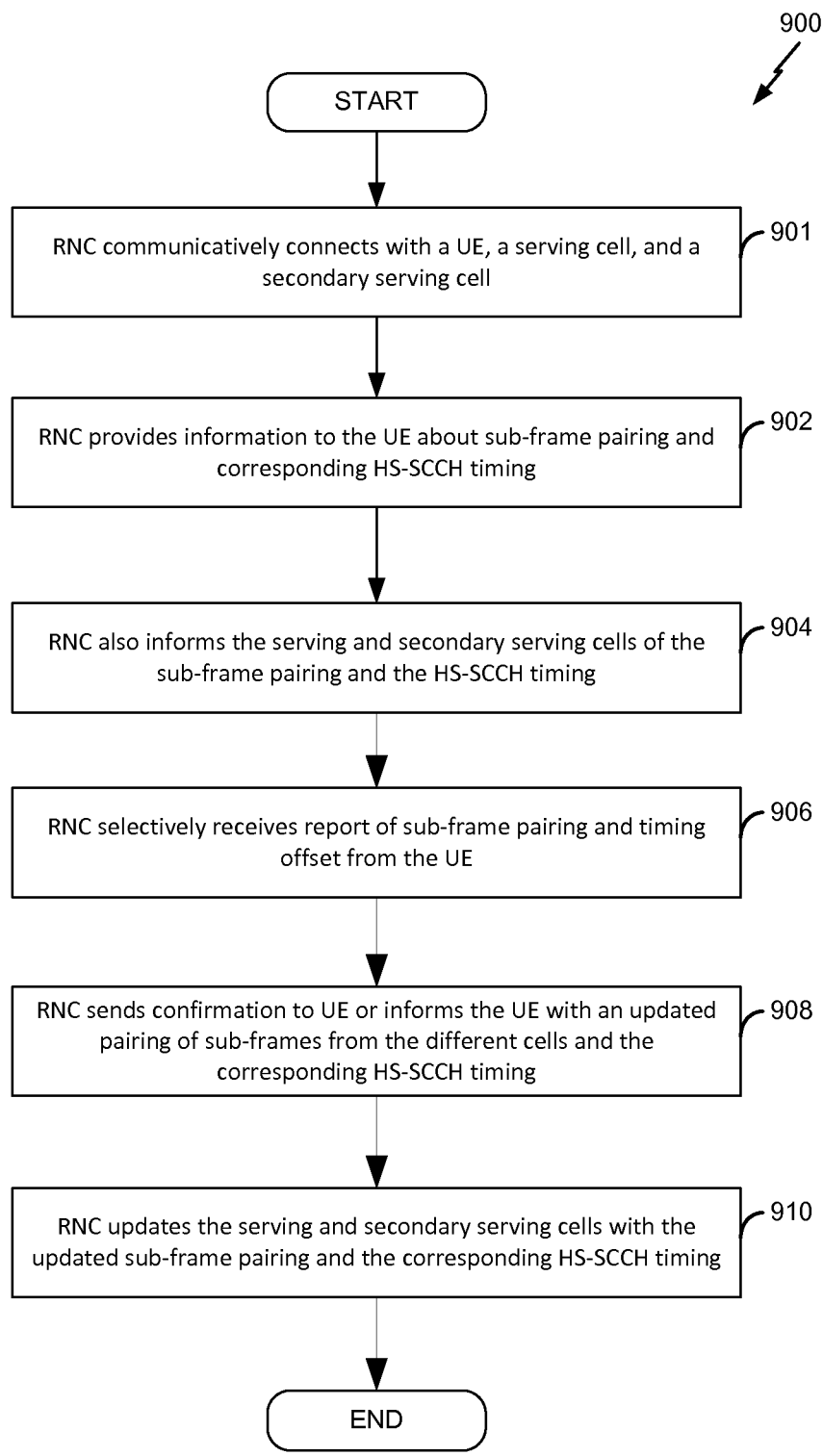
FIG. 9 is a flow chart illustrating an exemplary process of aligning downlink discontinuous reception patterns in multiflow HSDPA on an RNC configured in accordance with one aspect of the disclosed approach.

FIG. 9 is a flow chart illustrating an exemplary process 900 of aligning downlink discontinuous reception patterns in multiflow HSDPA on an RNC (e.g., an RNC 206) configured in accordance with one aspect of the disclosed approach. In FIG. 9, at 901, the RNC communicatively connects with a UE (e.g., a UE 210), a serving cell, and a secondary serving cell (e.g., a first and second cell in one of the NodeBs 208, or one cell in a first NodeB 208 and another cell in another NodeB 208). The RNC aligns HS-SCCHs in a multiflow transmission for the UE where, at 902, the RNC provides information to the UE about the desired or tentative sub-frame pairing (e.g., subframes 806 and 807 in FIG. 8) and corresponding HS-SCCH (CFN_DRX) timing through a Radio Resource Control (RRC) signaling message. In one aspect of the disclosed approach, the RNC determines (e.g., autonomously determines) the sub-frame pairing such that the maximum sub-frame offset from any of the cells does not exceed 1.5 slots. In one aspect, the sub-frame pairing sent to the UE may be subject to change based on a response from the UE to be described in more detail below. In another aspect of the disclosure, the UE does not report any event or timing offset on its own back to the RNC. In still another aspect, the RNC may send an indication as to which cell is the earlier cell to the UE. This earlier cell may be referred to as the time-reference cell. Once the UE knows which cell is the earlier cell, the UE can determine the sub-frame pairing automatically.

At 904, the RNC also informs the serving and secondary serving cells of the sub-frame pairing and the HS-SCCH timing. In one aspect of the disclosed approach, this notification may be achieved through a signaling protocol such as the UTRAN NodeB Application Part (NBAP), which is the protocol that allows for the control of a NodeB by an RNC. The timing offset between the two cells and the sub-frame pairing may be used to determine the association of the downlink and the uplink.

At 906, the RNC may receive a report from the UE of the current pairing of sub-frames from different cells along with the corresponding sub-frame offsets (timing offset). In one aspect of the disclosed approach, the UE will only report the timing offset information if the timing offset surpasses a threshold (e.g., 1.5 slots). Although the RNC attempted to achieve a sub-frame pairing in 902 below a particular sub-frame offset amount (e.g., under 1.5 slots), the timing offset actually experienced by the UE may be different because the RNC cannot determine the actual channel conditions experienced by the UE during the sub-frame pairing process. Thus, the offset information provided by the UE is more accurate and may allow for a more optimized sub-frame pairing, leading to an improved alignment of the HS-SCCH timing. Therefore, the sub-frame pairing in 902 may be tentative and different from the sub-frame pairing received from the UE in 906. In some aspects, the RNC does not receive from the UE information on sub-frame pairing and timing offset.

In one aspect of the disclosed approach, an event may be triggered and reported by the UE if the maximum sub-frame offset detected by the UE exceeds 1.5 slots, regardless of whether the timing offset surpasses the threshold. In one non-limiting example, as illustrated by FIG. 8, the timing of HS-SCCH-2 1002 does not change, but as the timing on HS-SCCH-1 1004 starts later than HS-SCCH-2 1002, the timing for HS-SCCH-1 1004 will be made dependent on that of HS-SCCH-2. In this example, subframe 2 1006 of HS-SCCH-1 is paired to subframe 2 1007 of HS-SCCH-2.

At 908, in one aspect of the disclosed approach, after receiving the sub-frame pairing and timing offset information from the UE, the RNC may selectively update the sub-frame pairing and inform the UE through RRC signaling with an updated pairing of sub-frames from the different cells and the corresponding HS-SCCH timing. In this aspect, the RNC selects and or updates the pairing of sub-frames from the different cells and informs the UE of this updated pairing of sub-frame from the different cells. In one aspect, the UE may not send any indication to the RNC regarding the sub-frame pairing and timing offset information. Updating the pairing refers to selecting different sets of sub-frames from one or more of the different cells. The RNC may also send information to the UE regarding HS-SCCH timing corresponding to this updated pairing. For example, the information may include timing information for a first DRX pattern (e.g., HS-SCCH-1) for the first cell and a second DRX pattern (e.g., HS-SCCH-2) for the second cell, the first and second DRX patterns being substantially aligned based on the timing offset. In one aspect, the RNC may indicate the alignment of the first and second DRX patterns through a variable. Based on this variable, the UE computes the CFN_DRX. That is, the CFN_DRX is not explicitly signaled but is implicitly done through this variable. For example, the CFN_DRX may be based on a $\tau_{DRX}$ variable. In one aspect, the new CFN_DRX may be achieved by adding a modifier to the $\tau_{DRX}$ variable because changing the $\tau_{DRX}$ variable effectively changes the CFN_DRX of the later cell. Therefore, the new $\tau_{DRX}$ may be ($\tau_{DRX}$*DRX_Offset), and this DRX_Offset may be signaled by an RNC 206 to the NodeBs 208 and the UE 210 to ensure the overlap of the DRX timing.

At 910, once the sub-frame pairing and timing offset information has been processed, the RNC may update the serving and secondary serving cells involved in the multiflow transmissions with the updated sub-frame pairing and the corresponding HS-SCCH timing through NBAP signaling. According to aspects of the disclosure, the CFN_DRX shifting on the later cell (e.g., HS-SCCH-1 1004) requires no extra signaling. For example, RRC signaling, such as that used for dynamic cell pairing may be used.

In another aspect, the RNC may not perform all the operations of blocks 902 through block 904. For example, the RNC may send a request to the UE to select a suitable sub-frame pairing in order to minimize the power-on time of its receiver. In this aspect, the UE selects the sub-frame pairing and send the selected sub-frame pairing and timing offset information to the RNC. Therefore, after the RNC receives the sub-frame timing and timing offset from the UE in block 906, it will confirm the pairing by transmitting a confirmation through, for example, RRC signaling in block 908. In one aspect, the confirmation may include the updated sub-frame pairing and corresponding timing.

Figure 10:
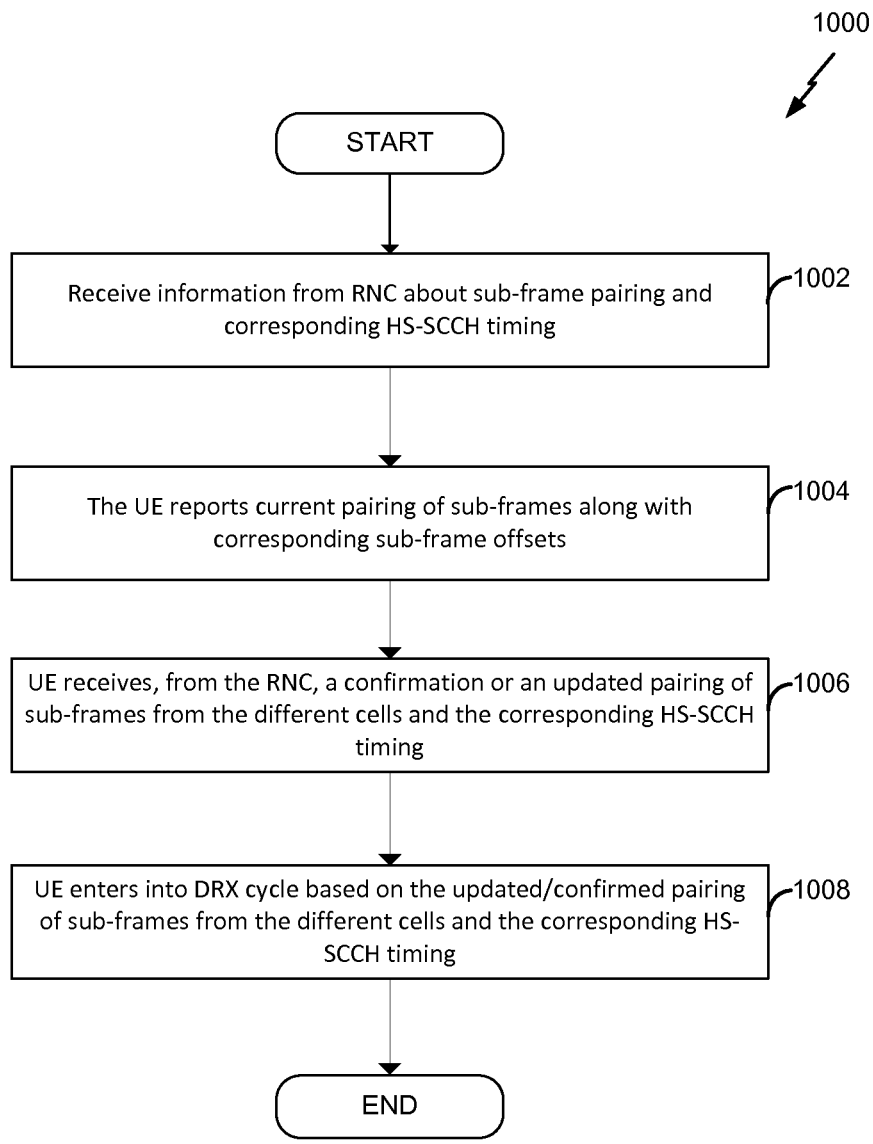
FIG. 10 is a flow chart illustrating an exemplary process of aligning downlink discontinuous reception patterns in multiflow HSDPA on a UE configured in accordance with one aspect of the disclosed approach.

FIG. 10 illustrates a process 1000 for aligning HS-SCCH timing in a multiflow transmission for a UE (e.g., a UE 210) where, at 1002, the UE receives information from an RNC (e.g., an RNC 206) about the desired or tentative sub-frame pairing and corresponding HS-SCCH timing through, for example, an RRC message. As discussed above, in one aspect of the disclosed approach, the sub-frame pairing is determined such that the maximum sub-frame offset from any of the cells (HS-SCCHs) does not exceed 1.5 slots.

In another aspect, the UE may not receive the subframe pairing and corresponding HS-SCCH timing from the RNC. Instead, the UE may receive a pairing request from the RNC to select the suitable subframe pairing and corresponding HS-SCCH timing.

At 1004, the UE reports the current selected pairing of sub-frames from different cells along with the corresponding sub-frame offset as detected by the UE. The sub-frame offset or timing offset is representative of a sub-frame delay between the first cell and the second cell (e.g., HS-SCCH-1 and HS-SCCH-2). In one aspect of the disclosed approach, as discussed above, the UE will only report the timing offset information if the timing offset surpasses a threshold (e.g., 1.5 slots or more). Although the RNC attempted to achieve a sub-frame pairing in 1002 below a particular sub-frame offset amount (e.g., under 1.5 slots), the timing offset actually experienced and detected by the UE may be different because the RNC cannot determine the actual channel conditions experienced and detected by the UE during the sub-frame pairing process. Thus, the offset information provided by the UE is more accurate and may allow for a more optimized sub-frame pairing, leading to an improved alignment of the HS-SCCH timing. In one aspect of the disclosed approach, as discussed above, an event may be triggered and reported by the UE if the maximum sub-frame offset detected by the UE exceeds 1.5 slots.

At 1006, in one aspect of the disclosed approach, the UE may receive, through RRC signaling from the RNC, an updated pairing of sub-frames from the different cells and the corresponding HS-SCCH timing. As noted above, in this aspect, the RNC selects the updated pairing of sub-frames from the different cells. In another aspect, the UE may select the updated pairing, and the RNC may confirm the pairing by sending a confirmation through RRC signaling. The confirmation may include an updated sub-frame pairing and corresponding timing. In another aspect, the confirmation may include timing information for a first DRX pattern (e.g., HS-SCCH-1) for the first cell and a second DRX pattern (e.g., HS-SCCH-2) for the second cell, the first and second DRX patterns being substantially aligned based on the timing offset.

At 1008, once the sub-frame pairing and timing offset information has been received by the UE or confirmed by the RNC, the UE enters into a DRX cycle based on the updated or confirmed pairing of sub-frames from the different cells and the corresponding HS-SCCH timing.

It should be noted that the processes described above in FIGS. 9 and 10 may be implemented using such hardware as the apparatus 100 shown in FIG. 1, respectively. Thus, the processor 104 may be used to implement the processes 900 and 1000, which may be stored partly or completely as computer-readable instructions (e.g., software 107) in the memory 105 and or the computer-readable medium 106. In one aspect, the apparatus 100 or the UE 610 may provide the means for receiving a sub-frame pairing between a first cell and a second cell from a UE, the means for selectively updating the sub-frame pairing based on a timing offset representative of a sub-frame delay between the first cell and the second cell; and the means for transmitting a confirmation regarding the sub-frame pairing to the UE.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications comprising:
communicatively connecting with a user equipment (UE), a first cell, and a second cell;
determining a sub-frame pairing between the first cell and the second cell;
determining a timing offset representative of a sub-frame delay between the first cell and the second cell;
selectively updating the sub-frame pairing based on the timing offset by aligning a first downlink discontinuous reception (DRX) pattern of the first cell with a second DRX pattern of the second cell based on the sub-frame pairing;
transmitting timing information of the first and second DRX patterns to the UE; and
signaling the first cell and the second cell of the DRX patterns and corresponding timings.

2. The method of claim 1, further comprising transmitting a confirmation regarding the sub-frame pairing, or the updated sub-frame pairing and corresponding timing, to the UE.

3. The method of claim 1, wherein the determining the sub-frame pairing comprises receiving the sub-frame pairing between the first cell and the second cell, from the UE.

4. The method of claim 1, further comprising receiving the timing offset from the UE, as detected by the UE.

5. The method of claim 1, wherein the determining the sub-frame pairing comprises autonomously determining the sub-frame pairing between the first cell and the second cell at a radio network controller (RNC).

6. The method of claim 1, further comprising:
determining which of the first and second cells has an earlier timing; and
if the first cell has the earlier timing, updating the timing of the second DRX pattern based on the first DRX pattern while maintaining the timing of the first DRX pattern.

7. The method of claim 1, wherein the aligned first and second DRX patterns each comprise a first sub-frame, and a timing offset between the first sub-frames is 1.5 slots or less.

8. The method of claim 1,
wherein the first DRX pattern comprises sub-frames of a first HS-SCCH and the second DRX pattern comprises sub-frames of a second HS-SCCH, and
wherein the second HS-SCCH comprises a CFN_DRX(n) that starts at a time later than the start of a CFN_DRX(n) of the first HS-SCCH, where n is the frame number.

9. The method of claim 1, further comprising transmitting a tentative sub-frame pairing to the UE.

10. An apparatus for wireless communications, comprising:
means for communicatively connecting with a user equipment (UE), a first cell, and a second cell;
means for determining a sub-frame pairing between the first cell and the second cell;
means for determining a timing offset representative of a sub-frame delay between the first cell and the second cell;
means for selectively updating the sub-frame pairing based on the timing offset by aligning a first downlink discontinuous reception (DRX) pattern of the first cell with a second DRX pattern of the second cell based on the sub-frame pairing;
means for transmitting timing information of the first and second DRX patterns to the UE; and
means for signaling the first cell and the second cell of the DRX patterns and corresponding timings.

11. The apparatus of claim 10, further comprising means for transmitting a confirmation regarding the sub-frame pairing, or the updated sub-frame pairing and corresponding timing, to the UE.

12. The apparatus of claim 10, wherein the means for determining the sub-frame pairing comprises means for receiving the sub-frame pairing between the first cell and the second cell, from the UE.

13. The apparatus of claim 10, further comprising means for receiving the timing offset from the UE, as detected by the UE.

14. A computer program product, comprising:
a computer-readable medium comprising code for causing a radio network controller (RNC) to:
communicatively connect with a user equipment (UE), a first cell, and a second cell;
determine a sub-frame pairing between the first cell and the second cell;
determine a timing offset representative of a sub-frame delay between the first cell and the second cell;
selectively update the sub-frame pairing based on the timing offset by aligning a first downlink discontinuous reception (DRX) pattern of the first cell with a second DRX pattern of the second cell based on the sub-frame pairing;
transmit timing information of the first and second DRX patterns to the UE; and
signal the first cell and the second cell of the DRX patterns and corresponding timings.

15. The computer program product of claim 14, wherein the computer-readable medium further comprises code for causing the RNC to transmit a confirmation regarding the sub-frame pairing, or the updated sub-frame pairing and corresponding timing, to the UE.

16. The computer program product of claim 14, wherein the computer-readable medium further comprises code for causing the RNC to receive the sub-frame pairing between the first cell and the second cell, from the UE.

17. The computer program product of claim 14, wherein the computer-readable medium further comprises code for causing the RNC to receive the timing offset from the UE, as detected by the UE.

18. An apparatus for wireless communications comprising:
at least one processor;
a memory coupled to the at least one processor; and
a communication interface coupled to the at least one processor,
wherein the at least one processor is configured to:
communicatively connect with a user equipment (UE), a first cell, and a second cell;
determine a sub-frame pairing between the first cell and the second cell;
determine a timing offset representative of a sub-frame delay between the first cell and the second cell;
selectively update the sub-frame pairing based on the timing offset by aligning a first downlink discontinuous reception (DRX) pattern of the first cell with a second DRX pattern of the second cell based on the sub-frame pairing;
transmit timing information of the first and second DRX patterns to the UE; and
signal the first cell and the second cell of the DRX patterns and corresponding timings.

19. The apparatus of claim 18, wherein the at least one processor is further configured to transmit a confirmation regarding the sub-frame pairing, or the updated sub-frame pairing and corresponding timing, to the UE.

20. The apparatus of claim 18, wherein the at least one processor is further configured to receive the sub-frame pairing between the first cell and the second cell, from the UE.

21. The apparatus of claim 18, wherein the at least one processor is further configured to receive the timing offset from the UE, as detected by the UE.

22. The apparatus of claim 18, wherein the at least one processor is further configured to autonomously determine the sub-frame pairing between the first cell and the second cell.

23. The apparatus of claim 18, wherein the at least one processor is further configured to:
determine which of the first and second cells has an earlier timing; and
if the first cell has the earlier timing, update the timing of the second DRX pattern based on the first DRX pattern while maintaining the timing of the first DRX pattern.

24. The apparatus of claim 18, wherein the aligned first and second DRX patterns each comprise a first sub-frame, and a timing offset between the first sub-frames is 1.5 slots or less.

25. The apparatus of claim 18,
wherein the first DRX pattern comprises sub-frames of a first HS-SCCH, and the second DRX pattern comprises sub-frames of a second HS-SCCH, and
wherein the second HS-SCCH comprises a CFN_DRX(n) that starts at a time later than the start of a CFN_DRX(n) of the first HS-SCCH, where n is the frame number.

26. The apparatus of claim 18, wherein the at least one processor is further configured to transmit a tentative sub-frame pairing to the UE.

27. A method for wireless communications comprising:
transmitting a current sub-frame pairing between a first cell and a second cell to an RNC, the current sub-frame pairing having a timing offset representative of a sub-frame delay between the first cell and the second cell; and
receiving a confirmation regarding the sub-frame pairing, or an updated sub-frame pairing between the first and second cells and corresponding timing, from the RNC,
wherein, when receiving the updated sub-frame pairing, receiving timing information for a first downlink discontinuous reception (DRX) pattern for the first cell and a second DRX pattern for the second cell, the first and second DRX patterns being aligned based on the timing offset.

28. The method of claim 27, further comprising entering into a discontinuous reception (DRX) mode based on the confirmation, or the updated sub-frame pairing and corresponding timing.

29. The method of claim 27, further comprising detecting the timing offset and transmitting the timing offset to the RNC.

30. The method of claim 27, further comprising:
determining at an UE the current sub-frame pairing between the first and second cells and corresponding timing.

31. The method of claim 27, wherein when the first cell is characterized by an earlier timing than that of the second cell, the timing of the second DRX pattern is different between the current and updated sub-frame pairings, while the timing of the first DRX pattern remains the same in the current and updated sub-frame pairings.

32. The method of claim 27, wherein a first sub-frame of the first DRX pattern is paired with a second sub-frame of the second DRX pattern, and a timing offset between the first sub-frame and the second sub-frame is 1.5 slots or less.

33. The method of claim 27,
wherein the first DRX pattern and the second DRX pattern comprise a first HS-SCCH and a second HS-SCCH, respectively, aligned in sub-frame timing, and
wherein the second HS-SCCH comprises a CFN_DRX(n) that starts at a time later than the start of a CFN_DRX(n) of the first HS-SCCH, where n is the frame number.

34. The method of claim 27, further comprising, before transmitting the current sub-frame pairing to the RNC, receiving a tentative sub-frame pairing from the RNC.

35. An apparatus for wireless communications comprising:
means for transmitting a current sub-frame pairing between a first cell and a second cell to an RNC, the current sub-frame pairing having a timing offset representative of a sub-frame delay between the first cell and the second cell; and
means for receiving a confirmation regarding the sub-frame pairing, or an updated sub-frame pairing between the first and second cells and corresponding timing, from the RNC,
wherein, when receiving the updated sub-frame pairing, the means for receiving is further configured to receive timing information for a first downlink discontinuous reception (DRX) pattern for the first cell and a second DRX pattern for the second cell, the first and second DRX patterns being aligned based on the timing offset.

36. The apparatus of claim 35, further comprising means for entering into a discontinuous reception (DRX) mode based on the confirmation, or the updated sub-frame pairing and corresponding timing.

37. The apparatus of claim 35, further comprising means for detecting the timing offset and transmitting the timing offset to the RNC.

38. The apparatus of claim 35, further comprising:
means for determining the current sub-frame pairing between the first and second cells and corresponding timing.

39. A computer program product, comprising:
a computer-readable medium comprising code for causing a UE to:
transmit a current sub-frame pairing between a first cell and a second cell to an RNC, the current sub-frame pairing having a timing offset representative of a sub-frame delay between the first cell and the second cell; and
receive a confirmation regarding the sub-frame pairing, or an updated sub-frame pairing between the first and second cells and corresponding timing, from the RNC,
wherein, when receiving the updated sub-frame pairing, the code for causing a UE to receive is further configured to receive timing information for a first downlink discontinuous reception (DRX) pattern for the first cell and a second DRX pattern for the second cell, the first and second DRX patterns being aligned based on the timing offset.

40. The computer program product of claim 39, wherein the computer-readable medium further comprises code for causing the UE to enter into a discontinuous reception (DRX) mode based on the confirmation, or the updated sub-frame pairing and corresponding timing.

41. The computer program product of claim 39, wherein the computer-readable medium further comprises code for causing the UE to detect the timing offset and transmit the timing offset to the RNC.

42. The computer program product of claim 39, wherein the computer-readable medium further comprises code for causing the UE to determine the current sub-frame pairing between the first and second cells and corresponding timing.

43. An apparatus for wireless communication, comprising:
at least one processor;
a communication interface coupled to the at least one processor; and
a memory coupled to the at least one processor,
wherein the at least one processor is configured to:
transmit a current sub-frame pairing between a first cell and a second cell to an RNC, the current sub-frame pairing having a timing offset representative of a sub-frame delay between the first cell and the second cell; and
receive a confirmation regarding the sub-frame pairing, or an updated sub-frame pairing between the first and second cells and corresponding timing, from the RNC,
wherein when receiving the updated sub-frame pairing, the at least one processor is further configured to receive timing information for a first downlink discontinuous reception (DRX) pattern for the first cell and a second DRX pattern for the second cell, the first and second DRX patterns being aligned based on the timing offset.

44. The apparatus of claim 43, wherein the at least one processor is further configured to enter into a discontinuous reception (DRX) mode based on the confirmation, or the updated sub-frame pairing and corresponding timing.

45. The apparatus of claim 43, wherein the at least one processor is further configured to detect the timing offset and transmit the timing offset to the RNC.

46. The apparatus of claim 43, wherein the at least one processor is further configured to determine the current sub-frame pairing between the first and second cells and corresponding timing.

47. The apparatus of claim 43, wherein when the first cell is characterized by an earlier timing than that of the second cell, and the timing of the second DRX pattern is different between the current and updated sub-frame pairings, while the timing of the first DRX pattern remains the same in the current and updated sub-frame pairings.

48. The apparatus of claim 43, wherein a first sub-frame of the first DRX pattern is paired with a second sub-frame of the second DRX pattern, and a timing offset between the first sub-frame and the second sub-frame is 1.5 slots or less.

49. The apparatus of claim 43,
wherein the first DRX pattern and the second DRX pattern comprise a first HS-SCCH and a second HS-SCCH, respectively, aligned in sub-frame timing, and
wherein the second HS-SCCH comprises a CFN_DRX(n) that starts at a time later than the start of a CFN_DRX(n) of the first HS-SCCH, where n is the frame number.

50. The apparatus of claim 43, wherein the at least one processor is further configured to receive, before transmitting the current sub-frame pairing to the RNC, a tentative sub-frame pairing from the RNC.

\* \* \* \* \*